Patented Feb. 6, 1940

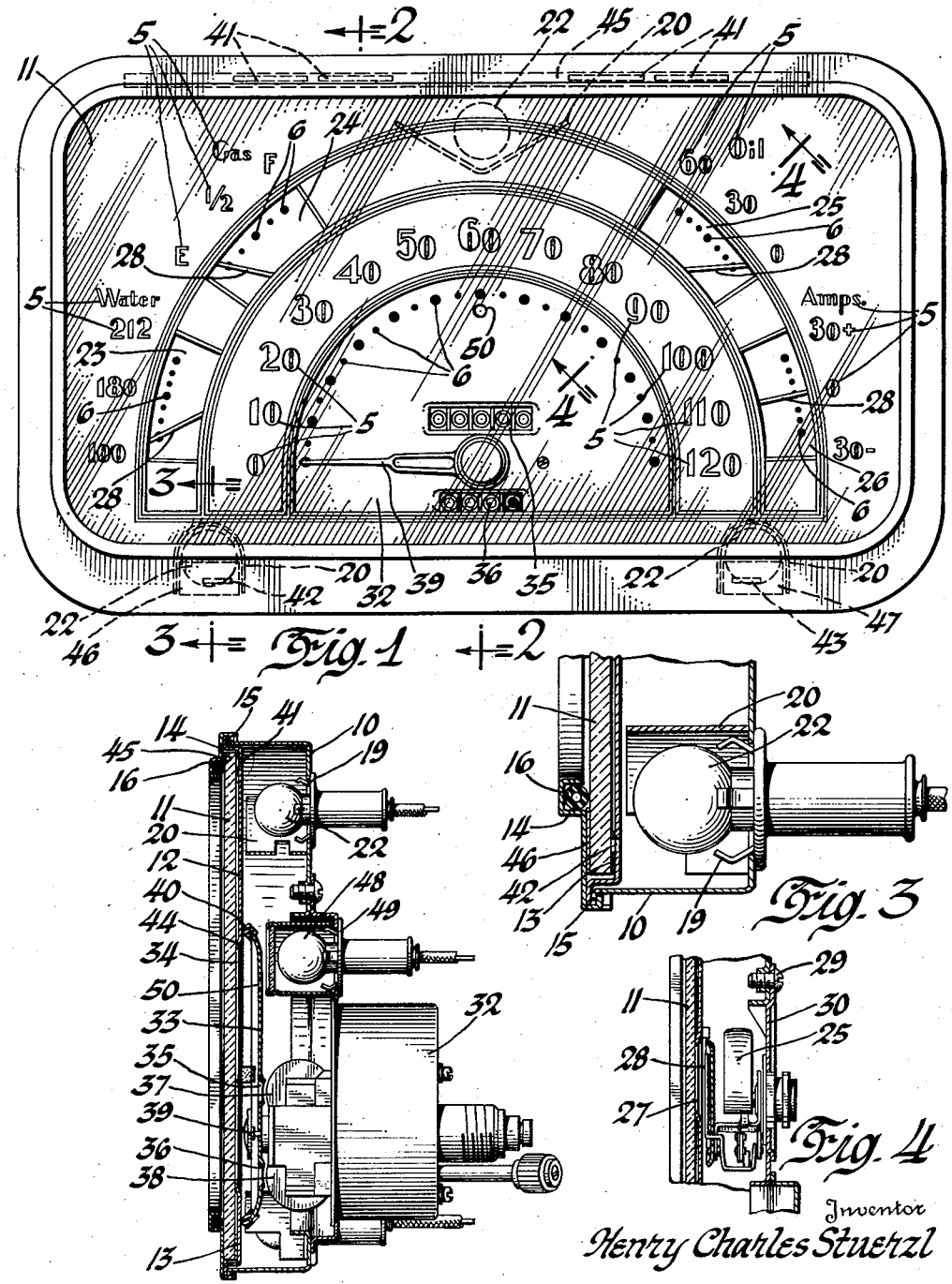

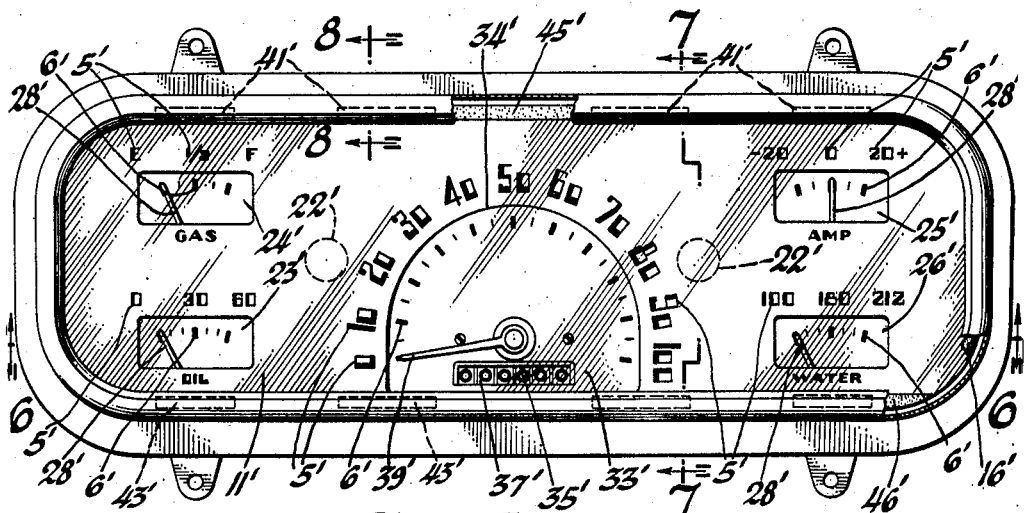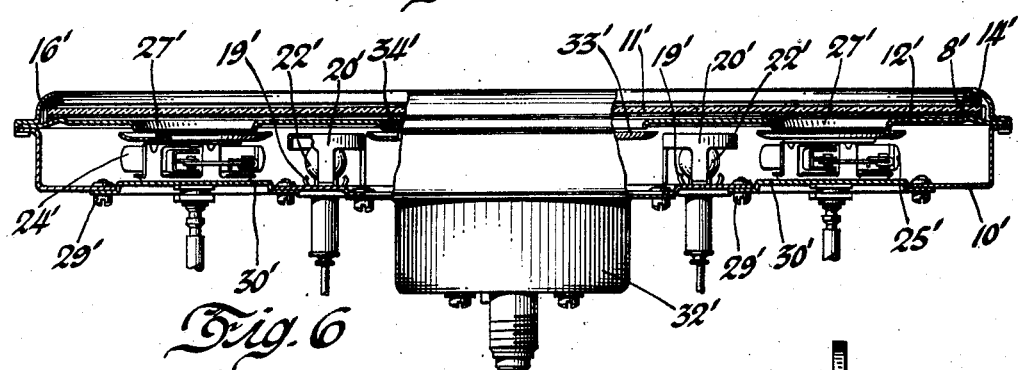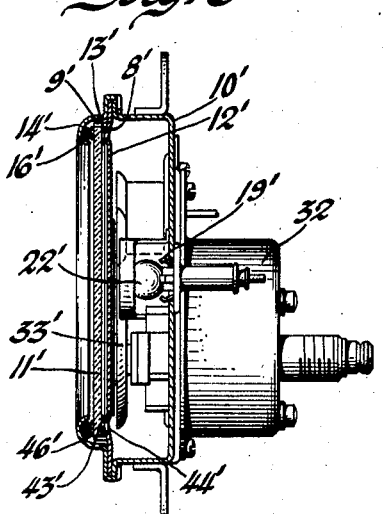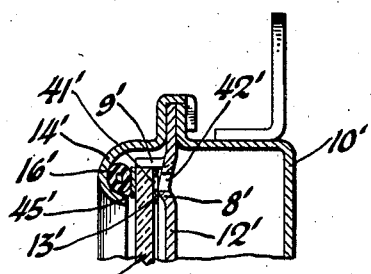

2,189,536

UNITED STATES PATENT OFFICE 2,189,536

INSTRUMENT LIGHTING

Henry Charles Stuerzl, Flint, Mich., assignor to General Motors Corporation, Detroit, Mich., a corporation of Delaware Application November 7, 1936, Serial No. 109,612

1 Claim. (Cl. 116—129)

This invention relates to illuminating means and more particularly to means for illuminating dials of instruments of vehicles to notify the operator of the various conditions under which the vehicle is operating.

In the operation of a motor car, for example, it is desirable that the operator thereof may be able to see at a glance the several instruments on the instrument panel. In driving at night this necessitates some means for illuminating the several dials of the instruments.

It is desirable that there be no glare in the eyes of the operator and to this end in recent years illuminating systems for instrument panels have been designed in which rays of light pass within the plane of a transparent glass panel or dial having indicia thereon, the indicia only being visible to the operator.

In my application Serial No. 56,147, filed December 26, 1935, I have described and claimed a means for illuminating an indicating dial having certain advantages over the devices heretofore used involving the travel of light rays within the plane of a glass dial or panel. The present invention relates to certain improvements in, and simplification of, the construction disclosed in said application, Serial No. 56,147.

It is an object of my invention to provide an instrument panel of pleasing appearance involving the use of a glass or other transparent panel through which light rays are caused to travel within the plane of the panel by means of reflection and diffusion.

Another object of my invention is to provide an improved means for illuminating a glass or other transparent dial or panel of the type in which rays travel within the plane of the glass dial.

Still another object of my invention is to provide an improved mounting for a glass or other transparent dial of an instrument panel.

A further object of my invention is an improved and simplified construction for supporting the glass or other transparent dial in spaced relation to a backing member.

It is also an object of my invention to provide an improved and simplified construction of instrument panel in which the instrument or instruments, a source of illumination, light shields, a glass dial, a backing member and a housing may be conveniently arranged in compact relation one to the other, and may be easily manufactured and assembled.

Other advantages of my invention reside in the specific combinations and arrangements of parts as will become more apparent as description proceeds.

Reference is herein made to the accompanying drawings forming a part of this specification in which:

Figure 1 is a front elevational view of an instrument panel embodying my invention.

Figure 2 is view on the line 2—2 of Figure 1.

Figure 3 is a detail view on the line 3—3 in Figure 1 showing the manner in which the glass dial is held in spaced relation to the retainer plate and the means by which the light is admitted to the glass dial or panel.

Figure 4 is a detail view taken substantially on the line 4—4 in Figure 1.

Figure 5 is a view generally similar to Figure 1 of another embodiment of my invention.

Figure 6 is a view substantially on the line 6—6 in Figure 5.

Figure 7 is a sectional view on the line 7—7 in Figure 5.

Figure 8 is a detail on the line 8—8 in Figure 5.

In the drawings, Figures 1–4, inclusive, 10 is a casing closed at the front by a generally rectangular glass dial or panel 11. Between the dial and casing is a flanged retainer plate 12 spaced from the dial by means of gasket 13. A grooved bezel 14 holds the retainer plate and glass dial in place by having one edge thereof crimped over flange 15 of casing 10. In the grooved portion of the bezel is a suitable hollow rubber or other gasket 16 to provide a resilient bearing on the front of the glass dial 11.

Within the casing at three spaced points are light bulbs 22, supported in the back of the casing by yieldable means 19, for illuminating the inner portion of the casing and the glass dial. Also fixed to the casing are notched shield members 20, one for each light bulb, to distribute the light substantially evenly over the several parts to be illuminated.

Secured to the back of casing 10 are gauges 23, 24, 25, and 26 for registering water temperature, quantity of gasoline, oil pressure and charging rate, respectively. An opening 27 in the retainer plate allows a portion of the pointer 28 of each gauge to be visible to the operator from the front through the glass dial. The several gauges are secured to the casing by means of screw members 29 and plate 30, as illustrated in Figure 4.

Also secured to the back of the casing is a speedometer generally indicated at 32, having a dial portion 33 closing an opening 34 in the retainer plate 12. The portion of the retainer plate defining the opening is crimped at 44, as shown in Figure 2, in order to contact the glass panel and retain the remaining portion of the retainer plate spaced from the panel as shown. Openings 35 and 36 in the speedometer dial allow the odometer wheels 37 and 38, respectively, to be visible to the driver through the glass panel 11. Speedometer needle or pointer 39 is mounted between the speedometer dial and glass panel and is, of course, at all times visible to the operator. Spaced rubber or other contact pieces 40 which may be secured to prongs on the speedometer dial prevent any clatter or noise between said dial and the backing plate. Dots or graduations 6 are formed on each of the gauges and speedometer.

In the upper portion of the flanged retainer plate and gasket are spaced slots or opening 41 through which light from within the casing may enter the upper portion of the glass panel 11. As best seen in Figure 3, in the lower edge of the retainer plate and gasket, slots or other openings 42 and 43, respectively, are provided for a similar purpose. On the front side of the glass panel and preferably covered by the bezel are rather large strips or spots of opaque paint 45, 46 and 47 which stop the light passing through the glass panel by means of slots 41, 42, and 43 and cause a portion of the rays to remain in the glass panel and illuminate the characters 5 thereon as described in detail in my application Serial No. 56,157, filed December 26, 1935. The spots of paint act as reflectors and cause the rays of light to be diffused and deflected at an angle greater than the critical angle and remain within the glass panel. The several words and figures constituting the characters will be painted on the back side of the glass panel and the light rays within the glass will make the words and figures visible to the operator although the background will remain dark.

From the above it will be apparent that the words "gas", "oil", "amp", and "water", as well as the several figures on the instruments, will be illuminated by means of the light rays from within the transparent panel.

Thus in the form illustrated in Figures 1–4, inclusive, the faces of the several gauges and the speedometer will be illuminated by means of the light reflected within the casing. The several pointers of the gauges and speedometer and the graduations on each will be illuminated by means of light within the casing while the words and figures painted on the back of the glass panel will be illuminated by means of the rays passing within the glass panel.

A signal or tell tale light 48, see Figure 2, secured to the casing at 49 is visible to the operator by means of opening 50 in the speedometer dial and is so connected with the lighting system of the car that it gives an indication that the "bright lights" are on.

In the construction shown in Figures 5–8, inclusive, a casing 10' is closed at the front by means of a glass dial or panel 11' supported by means of a retainer plate 12' having a suitable rib 8' stamped therein bearing against a gasket 13' which maintains the retainer plate spaced from glass panel except at the rib portions. Tongue members 9' on the retainer plate locate the glass dial or panel. A bezel 14' having a gasket 16' therein secures to each other the glass panel, the retainer plate and the casing.

Two light bulbs 22', secured to the back of the casing by yieldable means 19', illuminate the inside of the casing and the glass panel. Fixed to the casing 10' are shield members 20' which distribute the light evenly within the casing and over the several parts to be illuminated.

Secured to the back of the casing by supporting plate members 30' and screws 29' are gauges 23', 24', 25' and 26'. A plurality of openings 27' in the retainer plate, one for each gauge, allows each gauge and a portion of its pointer 28' to be visible to the operator through the glass panel.

Symmetrically arranged with respect to two gauges on either side is a speedometer 32' having a dial portion 33' closing an opening 34' in the retainer plate, a pointer or needle 39' and odometer wheels 37'. An opening 35' in the speedometer dial 33' allows the odometer wheels of the speedometer to be visible from the front of the instrument panel.

At the upper and lower edges of the front side of the glass panel are narrow strips 45' and 46' of opaque paint which may be covered by means of bezel 14' and gasket 16' as shown. Suitable elongated coinciding slots or openings 41', 42' in the upper portion of the retainer plate and gasket respectively cause light to enter the glass panel and to be reflected by means of the opaque paint at the front thereof. A portion of the light will remain in the glass panel and cause the painted numerals and letters on the back thereof to become illuminated and visible to the operator at night. In the same manner coinciding elongated slots 43' and 44' in the lower portions of the panel and gasket, respectively, permit rays of light from the casing to be diffused and reflected within the glass panel to assist in the illumination of the several words and figures painted on the back of the glass panel.

The words and figures which constitute the several characters are indicated at 5' in Figures 5–8, inclusive, and the dots or graduations on the faces of the several instruments are indicated at 6'.

In each of the modifications shown and described it will be seen that the characters on the transparent panel or dial are illuminated by means of light rays travelling within the plane of the panel. The several figures and words printed on the back thereof will be lighted by the rays within the panel itself which strike the characters and are then reflected. The remaining portion of the transparent panel will form a dark background during night driving and thus there will be no appreciable glare. The several pointers and dials of the instruments will be illuminated by light reflected from the faces of the several instruments. However, by means of the lighting means provided including the shielded source of light, no glare will be apparent to the operator.

Various combinations of colors of the several instrument dials and indicia thereon may be provided. A suitable background of color on the retaining plate may be used to ensure that the letters on the panel will be readily visible in the daylight. The characters painted on the back of the glass panel may be of any desired color.

Various changes in the combinations and arrangements of the several parts may be made without departing from the spirit of my invention and I do not wish to limit the patent granted thereon other than as necessitated by the prior art.

I claim:

In an indicating device, a casing, a retaining plate, a transparent panel in front of said retaining plate, a rib stamped near the edge of the retaining plate for spacing the transparent plate from the retaining plate, an opening located in said rib, a second opening spaced from said first mentioned opening, painted characters on the back of said transparent panel, an instrument having indicia visible through the second mentioned opening, and a light source behind the opening in said stamped rib for illuminating said characters.

HENRY CHARLES STUERZL.